(12) United States Patent
Iida et al.

(10) Patent No.: US 7,240,488 B2
(45) Date of Patent: Jul. 10, 2007

(54) CRUISE CONTROL AND NEUTRAL RETURN MECHANISM FOR A HYDROSTATIC TRANSMISSION

(76) Inventors: Masaru Iida, 18-1, Inadera 2-chome, Amagasaki-shi, Hyogo (JP) 661-0981; Keith Andrews, 5943 Commerce Blvd., Morristown, TN (US) 37814-1051; Donald Wieber, 5943 Commerce Blvd., Morristown, TN (US) 37814-1051

( * ) Notice: Subject to any disclaimer, the term of this patent is extended or adjusted under 35 U.S.C. 154(b) by 194 days.

(21) Appl. No.: 11/048,111

(22) Filed: Feb. 2, 2005

(65) Prior Publication Data
US 2006/0169509 A1 Aug. 3, 2006

(51) Int. Cl.
*F16B 31/02* (2006.01)
(52) U.S. Cl. .............................. 60/436; 60/487; 92/12.2
(58) Field of Classification Search .................. 60/436, 60/487; 74/479.01; 92/12.2
See application file for complete search history.

(56) References Cited

U.S. PATENT DOCUMENTS

| 3,354,981 A | 11/1967 | Swanson et al. |
|---|---|---|
| 3,837,235 A | 9/1974 | Peterson |
| 4,087,970 A | 5/1978 | Slazas et al. |
| 4,496,035 A | 1/1985 | Wanie |
| 4,958,535 A | 9/1990 | Swartzendruber |
| 5,040,649 A | 8/1991 | Okada |
| 5,163,293 A | 11/1992 | Azuma et al. |
| 5,335,496 A | 8/1994 | Azuma et al. |
| 5,819,537 A | 10/1998 | Okada et al. |
| 6,766,715 B1 | 7/2004 | Wiley et al. |
| 6,837,142 B1 * | 1/2005 | Poplawski et al. ............ 92/12.2 |
| 6,880,333 B1 * | 4/2005 | Taylor et al. .................. 60/436 |
| 2004/0099457 A1 | 5/2004 | Wiley et al. |

\* cited by examiner

*Primary Examiner*—F. Daniel Lopez
(74) *Attorney, Agent, or Firm*—Sterne, Kessler, Goldstein & Fox P.L.L.C.

(57) ABSTRACT

A control arm is coupled to a control shaft of a hydraulic pump. A friction shaft extends parallel to the control shaft and is slidably moveable within an arcuate-shaped hole in the control arm. A stop plate is movably supported by the control shaft and the friction shaft. When the stop plate is in the operating position, a friction pad supported by the friction shaft is biased by a pressure plate and a spring against the control arm. When the stop plate is in the braking position, a sloping region of the stop plate engages a pin extending from the pressure plate such that the friction pad is spaced from the control arm and arcuate-shaped grooves in the stop plate engage pins extending from the control arm in a neutral position. The present invention also includes a hydrostatic transmission and a vehicle incorporating the cruise control and neutral return mechanism.

22 Claims, 13 Drawing Sheets

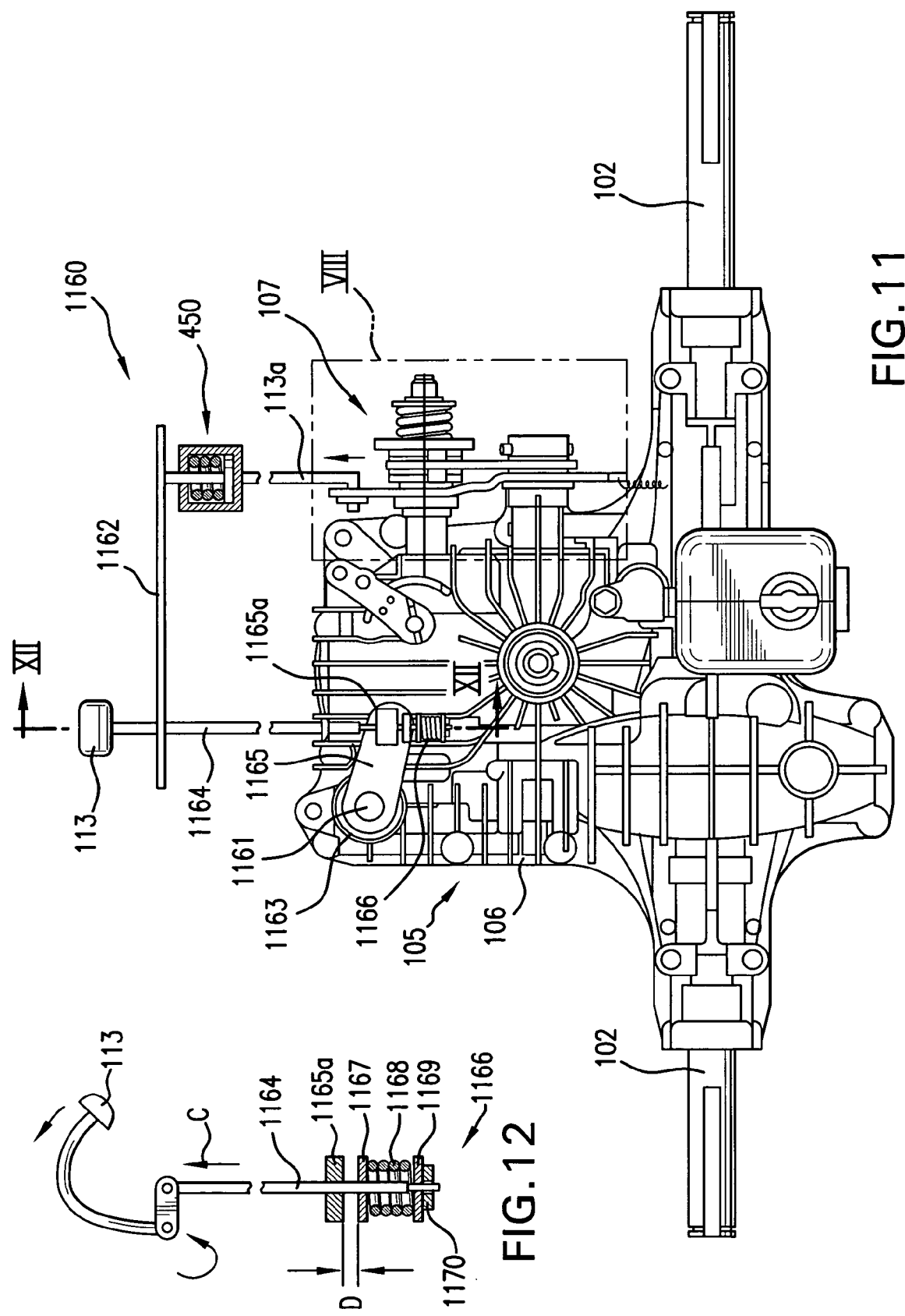

CRUISE CONTROL AND NEUTRAL RETURN MECHANISM FOR A HYDROSTATIC TRANSMISSION

FIELD OF THE INVENTION

The present invention relates generally to a cruise control and neutral return mechanism for a hydrostatic transmission and a vehicle incorporating such a mechanism.

BACKGROUND OF THE INVENTION

The use of hydrostatic transmissions ("HSTs"), including integrated hydrostatic transmissions ("IHTs"), are well known in the art for use with self-propelled vehicles such as tractors, riding lawn mowers, self-propelled lawn mowers, and the like. HSTs are fully described for example in U.S. Pat. Nos. 5,819,537, 5,335,496 and 5,163,293, each of which is incorporated by reference herein in its entirety.

Generally, an HST includes at least one hydraulic pump and at least one hydraulic motor, each having a cylinder block with reciprocating pistons. The pistons of a hydraulic pump are fluidly connected to the pistons of a hydraulic motor, for example through hydraulic fluid lines or a center section on which one or more of the pump and motor are mounted. The pump is generally driven by a prime mover, such as a typical combustion engine. The pump transfers power to the hydraulic motor which is coupled to one or more axles of a vehicle, such as those described above. A movable swash plate abuts against the tops of the pump pistons which controls the movement of the pistons within the cylinder block. The slant of the swash plate controls the amount and direction of hydraulic fluid discharged from the pump to the motor. When the swash plate is moved in a first direction, the discharged hydraulic fluid is channeled to the motor in a first direction, which in turn drives the wheels of the vehicle in a first driving direction. When the swash plate is moved in a second direction, the discharged hydraulic fluid is channeled to the motor in a second direction, which in turn drives the motor in a second driving direction opposite of the first driving direction. The swash plate also has a neutral position, wherein the swash plate is not tilted. In this neutral position, the pump does not discharge hydraulic fluid, the motor does not operate and the wheels do not move, even though the prime mover is powering the hydrostatic transmission. The movable swash plate is tilted by a trunnion arm which is connected to a control shaft for controlling the position of the movable swash plate, and thus the speed and direction of the hydraulic motor. The control shaft is usually turned by a control arm linked to an input device, such as a lever or pedal for a user to operate the vehicle.

As a safety precaution, HSTs conventionally have an automatic return-to-neutral mechanism, such as a spring-loaded control arm. When the operator is not physically moving the input device, the control arm is automatically returned to a neutral position and the vehicle is stopped. However, when the vehicle is being used for an extended period of time, it can be arduous for a user to hold the input device in an operating position in order to overcome the automatic return-to-neutral feature.

Thus, various cruise control devices have been developed to keep a control arm in an operating position for an extended period of time. However, many of these cruise control devices are very complex and require the cruise control device to overcome or to disable the force of a return-to-neutral system in order to hold the control arm in position. Also adding to the complexity, braking systems are necessary to disable the cruise control feature such that the conventional automatic return-to-neutral mechanism will return the control arm to a neutral position and thus stop the operation of the vehicle.

Thus, a more simple apparatus is desired to hold a control arm in position and to stop the operation of a vehicle when desired.

BRIEF SUMMARY OF THE INVENTION

The present invention is a simple arrangement of a hydrostatic transmission that does not utilize a conventional automatic return-to-neutral mechanism that must be overcome by a cruise control mechanism. Yet, with the present invention, a hydrostatic vehicle, such as a tractor or riding lawn mower, may be safely and comfortably operated by a user.

In one embodiment of the present invention, a cruise control and neutral return mechanism for a hydrostatic vehicle includes a hydraulic pump having a movable swash plate, a control shaft coupled to the movable swash plate, a control arm coupled to the control shaft, a stop plate slidingly engaging a portion of the control arm and having an operating position and a braking position, and a friction mechanism removably retaining the control arm in one of a neutral position or a desired operating position. The stop plate is capable of releasing the friction mechanism and positioning the control arm in the neutral position when in the braking position, but does not contact the friction mechanism or the control arm when in the operating position.

In another embodiment of the present invention, a hydrostatic transmission includes a hydraulic pump, including an input shaft, a movable swash plate and a control shaft coupled to the swash plate. The hydrostatic transmission also includes a housing incorporating at least the pump through which extends the control shaft, and a hydraulic motor fluidly connected to the hydraulic pump. A control arm is coupled to the control shaft and has various operating positions. A friction mechanism retains the control arm in one of the various operating positions. The friction mechanism includes at least one friction pad biased against the control arm via a pressure plate. A stop plate is slidingly supported by the control shaft and has an operating position and a braking position. The stop plate engages a portion of the control arm and a portion of the pressure plate when in the braking position.

In another embodiment of the present invention, a vehicle includes a vehicle chassis, a prime mover affixed to the chassis, a hydraulic pump including an input shaft coupled to the prime mover, a movable swash plate, and a control shaft coupled to the swash plate, a housing for encasing at least the hydraulic pump, a hydraulic motor fluidly interconnected to the hydraulic pump, an axle drivingly coupled to the hydraulic motor, a pair of drive wheels disposed on the axle, and a driving input device coupled to the control shaft of the hydraulic pump via a control arm. The housing has an exterior surface from which the input shaft and the control shaft of the hydraulic pump extend. The control arm extends in a plane perpendicular to the control shaft and has an arcuate-shaped hole therein. The control arm has at least one pin extending from a surface of the control arm such that the pin is parallel with the control shaft. A friction shaft extends from the exterior surface of the housing and parallel to the control shaft. The friction shaft is slidably moveable within the arcuate-shaped hole in the control arm. The friction shaft supports a pair of friction pads, a pressure plate and a spring biasing the friction pads towards one another. The pressure plate has at least one pin extending parallel to the friction shaft. A stop plate has a first slot movably supported by the control shaft and a second slot movably supported by the friction shaft. The stop plate is coupled to a braking input device. The braking input device is capable of sliding the stop plate along the first and second slots from an operating position to a braking position. The stop plate also has at least one arcuate-shaped groove receiving the at least one pin of the control arm. The stop plate has a first end adjacent the control shaft in a first plane adjacent the control arm, a gradually sloping region, and a second end adjacent the friction shaft in a second plane that is spaced away from the control arm. When the stop plate is in the operating position, the friction pads are biased against the control arm and, when the stop plate is in the braking position, the sloping region engages the pin of the pressure plate such that one of the friction pads are spaced away from the control arm and the at least one arcuate-shaped groove of the stop plate engages the at least one pin of the control arm.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 11 is a top plan view of a transaxle assembly incorporating the present invention.

FIG. 12 is a sectional view taken along line XII-XII of FIG. 11.

DETAILED DESCRIPTION OF THE INVENTION

Figure 1:
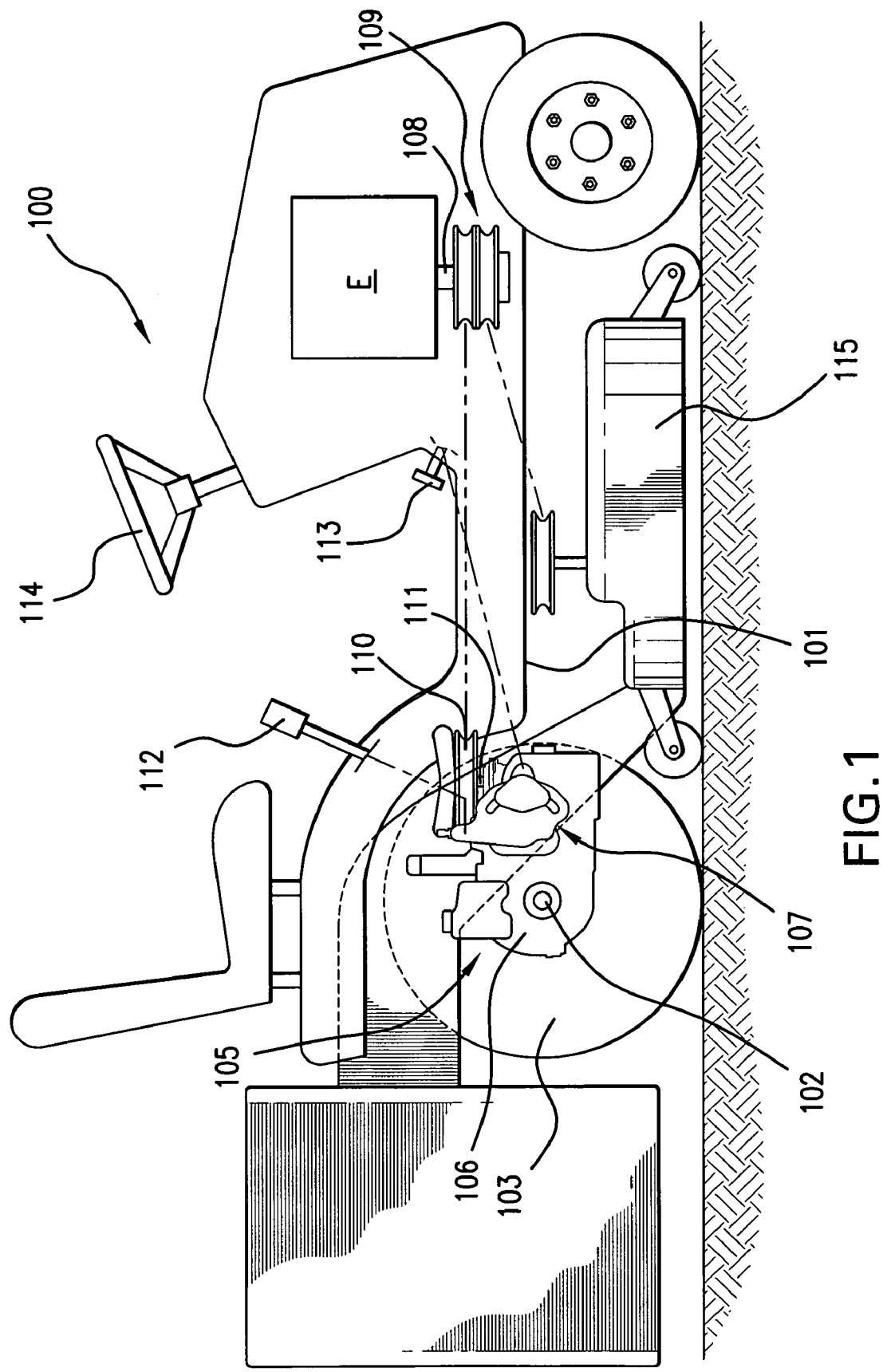
FIG. 1 is a side view of a vehicle incorporating the present invention.

The present invention will be described with reference to the accompanying drawings. The drawing in which an element first appears is typically indicated by the leftmost digit in the corresponding reference number.

The cruise control and neutral return mechanism disclosed herein is suitable for a variety of hydrostatic vehicles, such as tractors, riding lawn mowers, and the like. For example, FIG. 1 illustrates a vehicle 100 which is a suitable environment for use of the present invention. Vehicle 100 includes a vehicle chassis 101 and a prime mover, for example engine E illustrated in FIG. 1, which is affixed to vehicle chassis 101. Vehicle 100 also includes an axle 102 and drive wheels 103 that are attached to axle 102. In this example, axle 102 is incorporated into a transaxle assembly 105, which incorporates an IHT, including at least one hydraulic pump, at least one hydraulic motor, all supplemental gearing between the hydraulic motor and a portion of the axle into a single housing 106. Engine E has an output shaft 108 and a pulley system 109 which feeds power to an input shaft 111 of the IHT via a pulley 110. Vehicle 100 also features an operational input device, here lever 112, and a braking input device, here a pedal 113. However, each of operational input device and braking input device may be a lever, pedal, or any other suitable input devices that may be apparent to one skilled in the art. Vehicle 100 may optionally include a steering device, such as steering wheel 114, a mowing unit 115 and other any other conventional tractor or riding lawn mower additional features, for example additional mechanized farming equipment.

Figure 2:
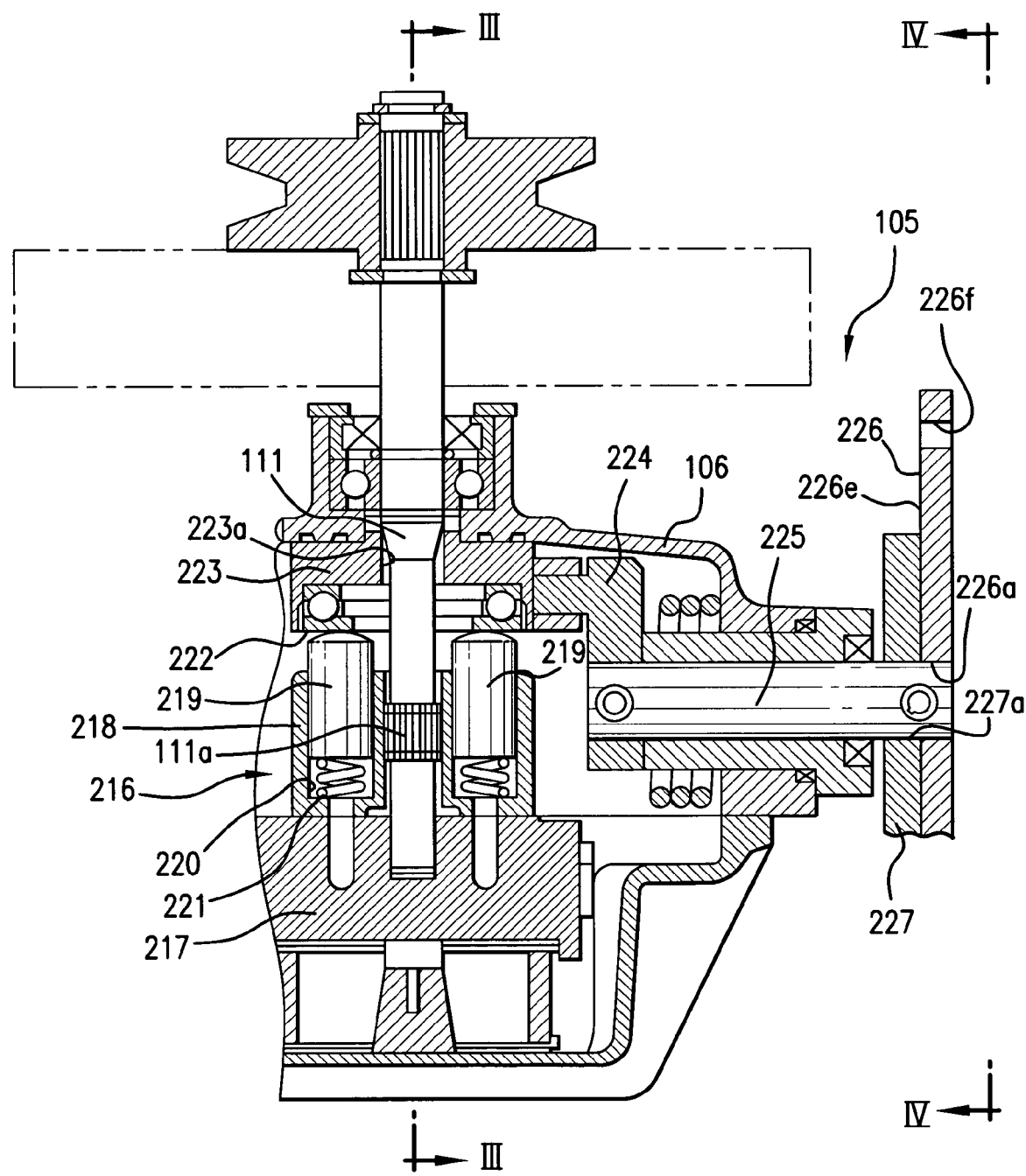
FIG. 2 is a rear sectional view of a portion of a hydraulic pump arrangement of the present invention.

A hydraulic pump 216 of a HST is shown in FIG. 2. Pump 216 is generally enclosed within a housing, for example housing 106 of the transaxle assembly 105 of FIG. 1. Pump 216 may be disposed on a surface of a center section 217 through which it is fluidly interconnected to a motor (not shown) which may be mounted on another surface of center section 217. Alternatively, the motor may be positioned away from pump 216, for example, adjacent driving wheels 103, and may be fluidly connected to pump 216 via hydraulic fluid lines. The motor is then coupled to axle 102 so as to drive the drive wheel of vehicle 100. Although the examples of FIGS. 1-3 show an IHT in which all of the driving elements are enclosed in a single housing, the present invention is equally suitable for any hydraulic pump/hydraulic motor/axle arrangement of a vehicle.

Pump 216 includes a cylinder block 218 rotatably and slidably disposed adjacent center section 217. Pistons 219 are fitted into cylinder bores 220 through biasing springs 221 and reciprocate within bores 220. A thrust bearing 222, held to a movable swash plate 223 abuts against the heads of pistons 219. At the center of movable swash plate 223 is an opening 223a through which input shaft 111 extends. Input shaft 111 is rotatably coupled to cylinder block 218 via gears 111a.

Figure 3:
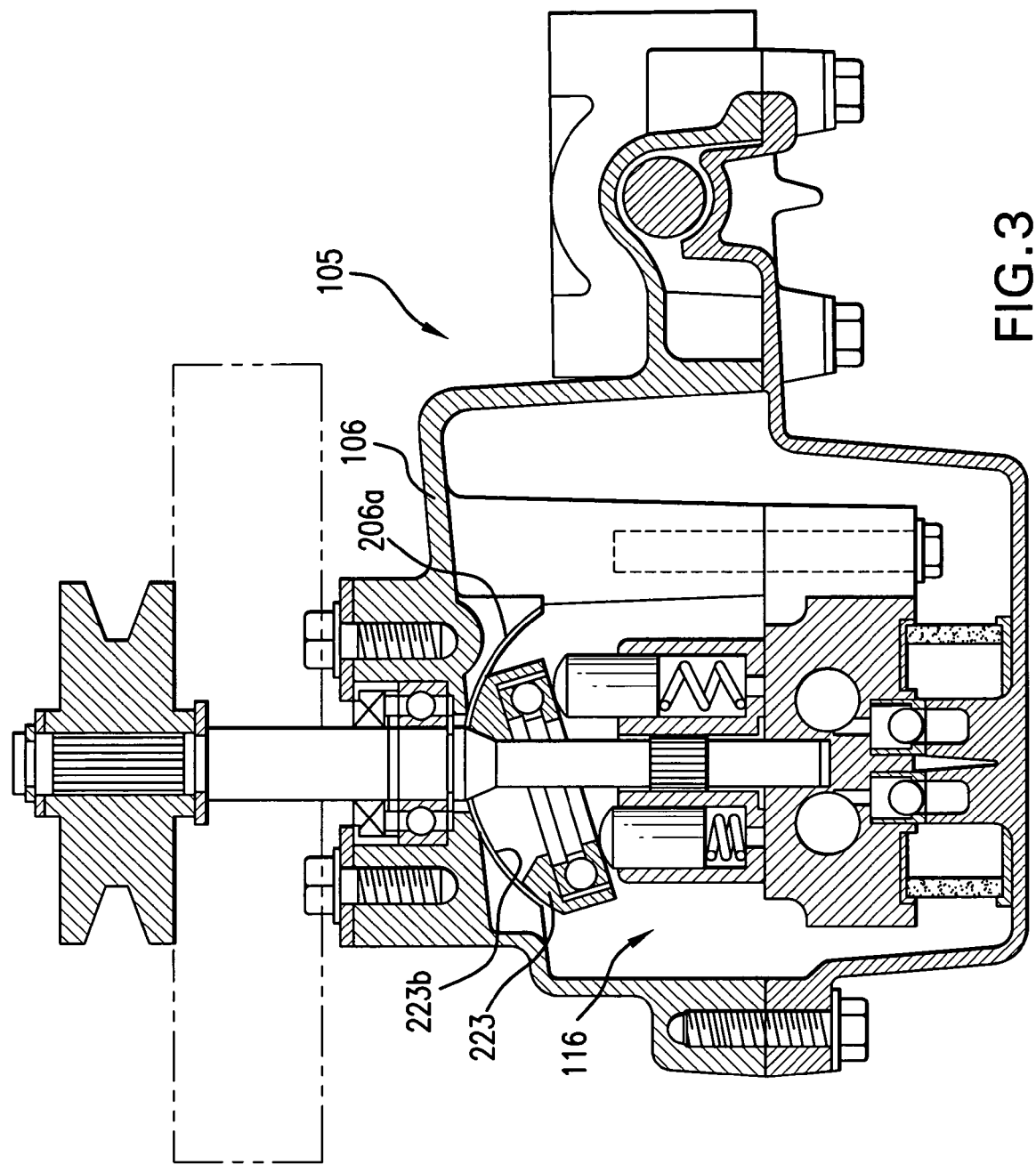
FIG. 3 is a side cross-sectional view taken along a line III-III of FIG. 2.

As seen in FIG. 3, which is a cross-sectional view of pump 216, swash plate 223 has a convex surface 223b which slides along a concave portion 206a of housing 106. The amount and direction of hydraulic fluid discharged from pump 216 is altered by the slant of swash plate 223 and thrust bearing 222. Returning to FIG. 2, swash plate 223 engages a trunnion arm 224 which is coupled to a control shaft 225. Control shaft 225 extends through housing 106 such that the slant of swash plate 223 can be altered from outside of housing 106. Control shaft 225 is coupled to a control arm 226 via a bore 226a in control arm 226. As shown in FIG. 2, a stop plate 227, which will be described in further detail below with respect to FIGS. 4-10, is also slidingly supported by control shaft 225 via a slot 227a.

Figure 4:
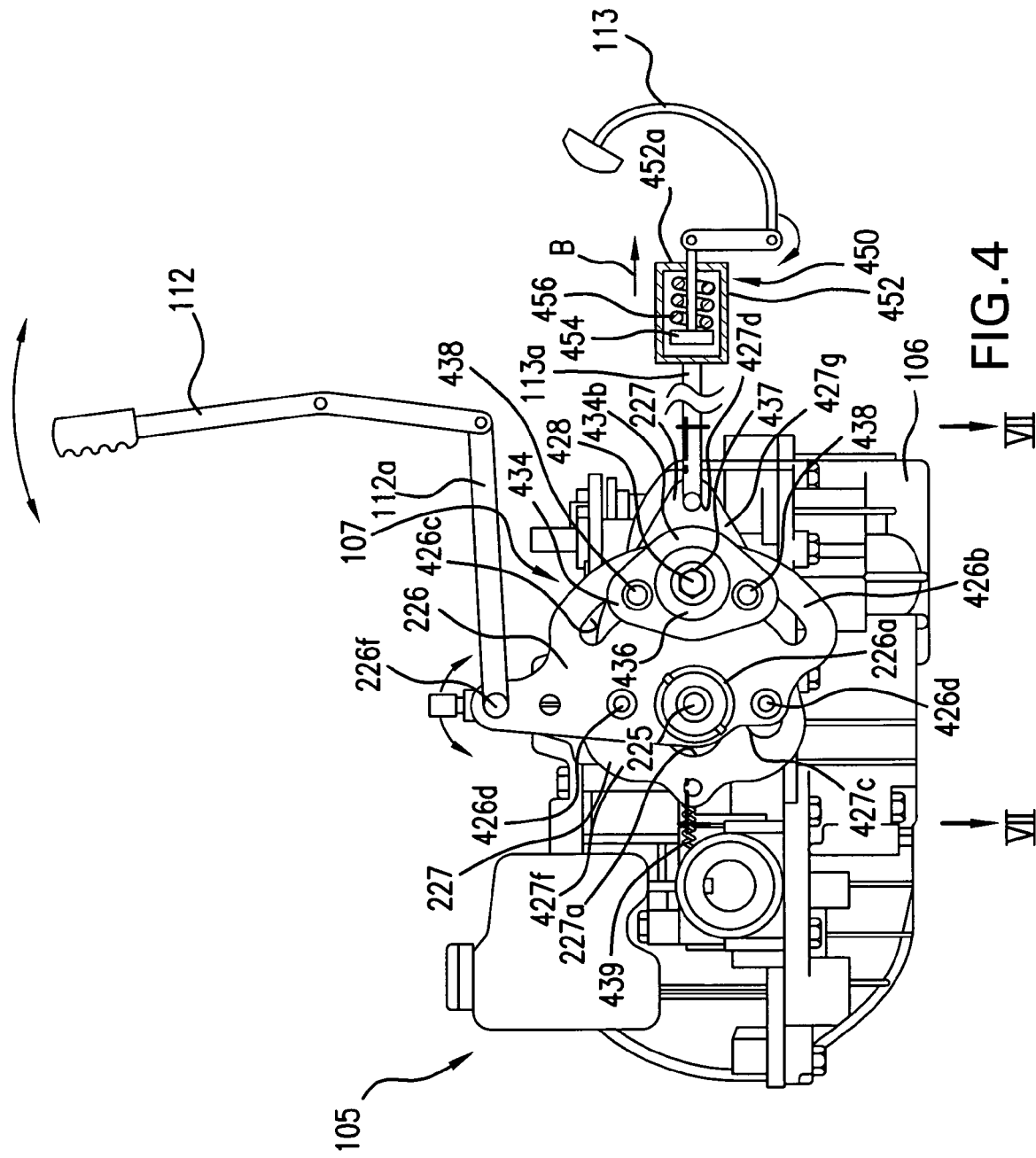
FIG. 4 is a plan side view of a transaxle assembly incorporating the present invention taken, for example, along line IV-IV of FIG. 2.
Figure 5:
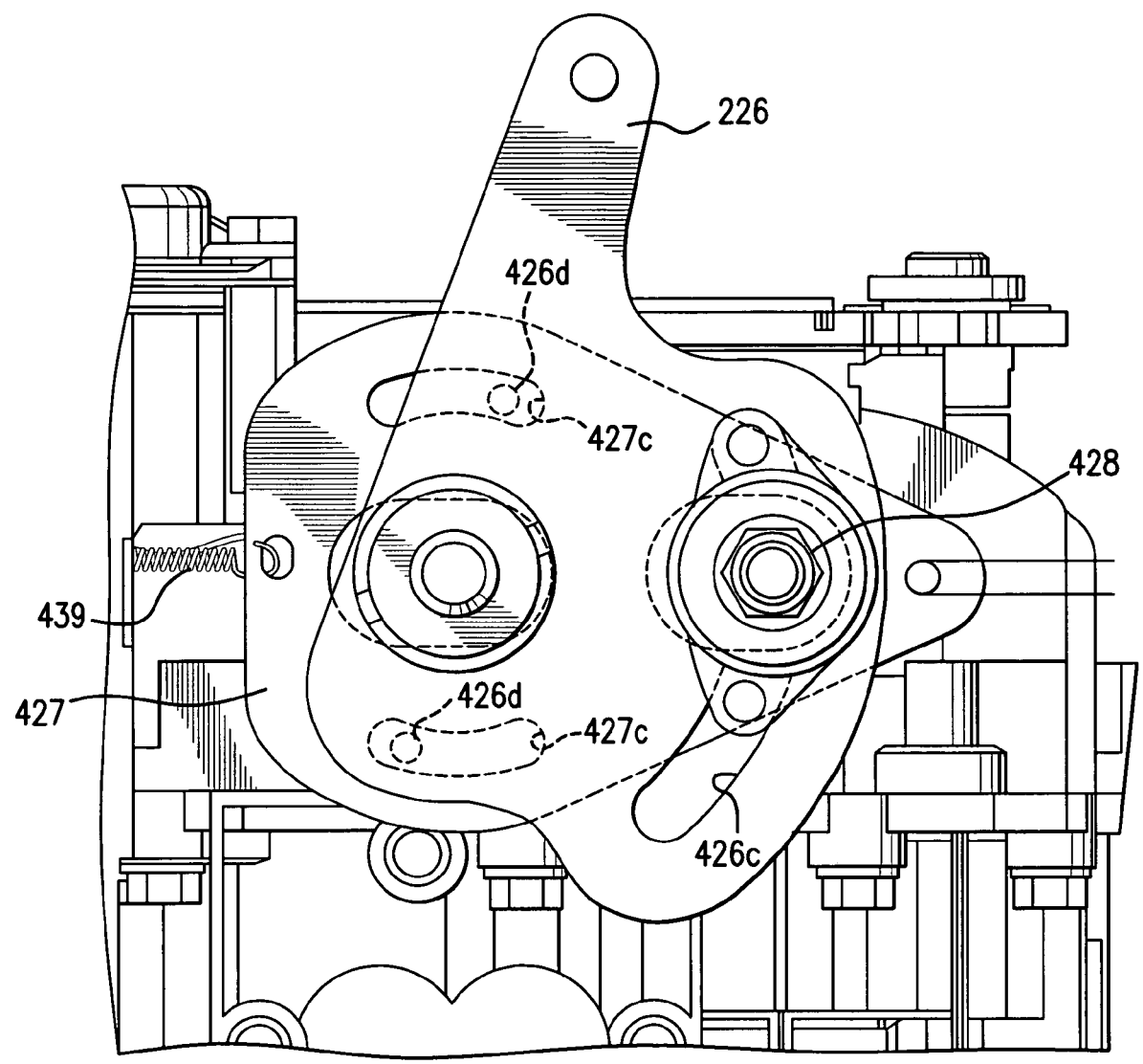
FIGS. 5-7 are various positions of the mechanism shown in FIG. 4.
Figure 6:
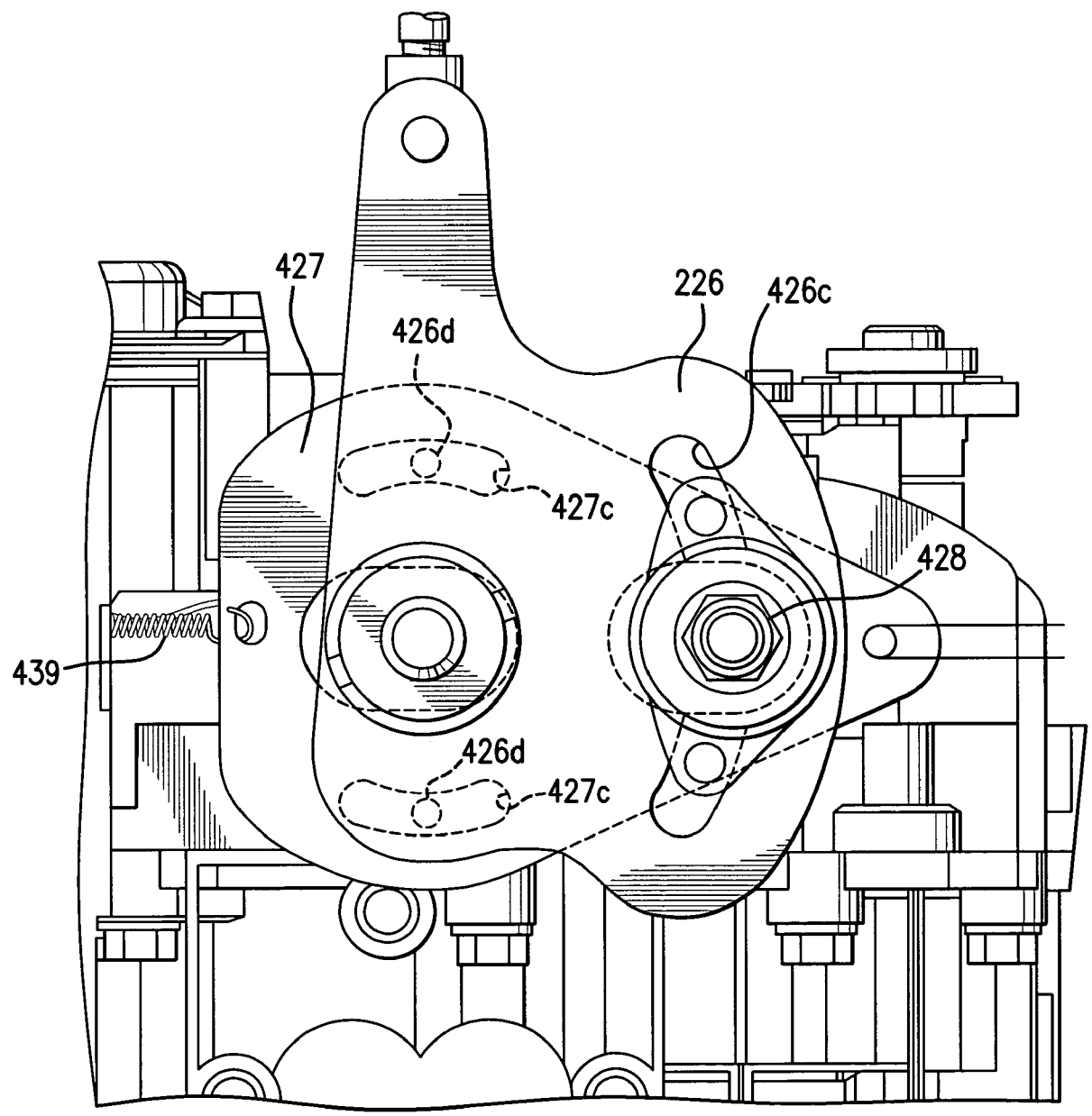
Figure 7:
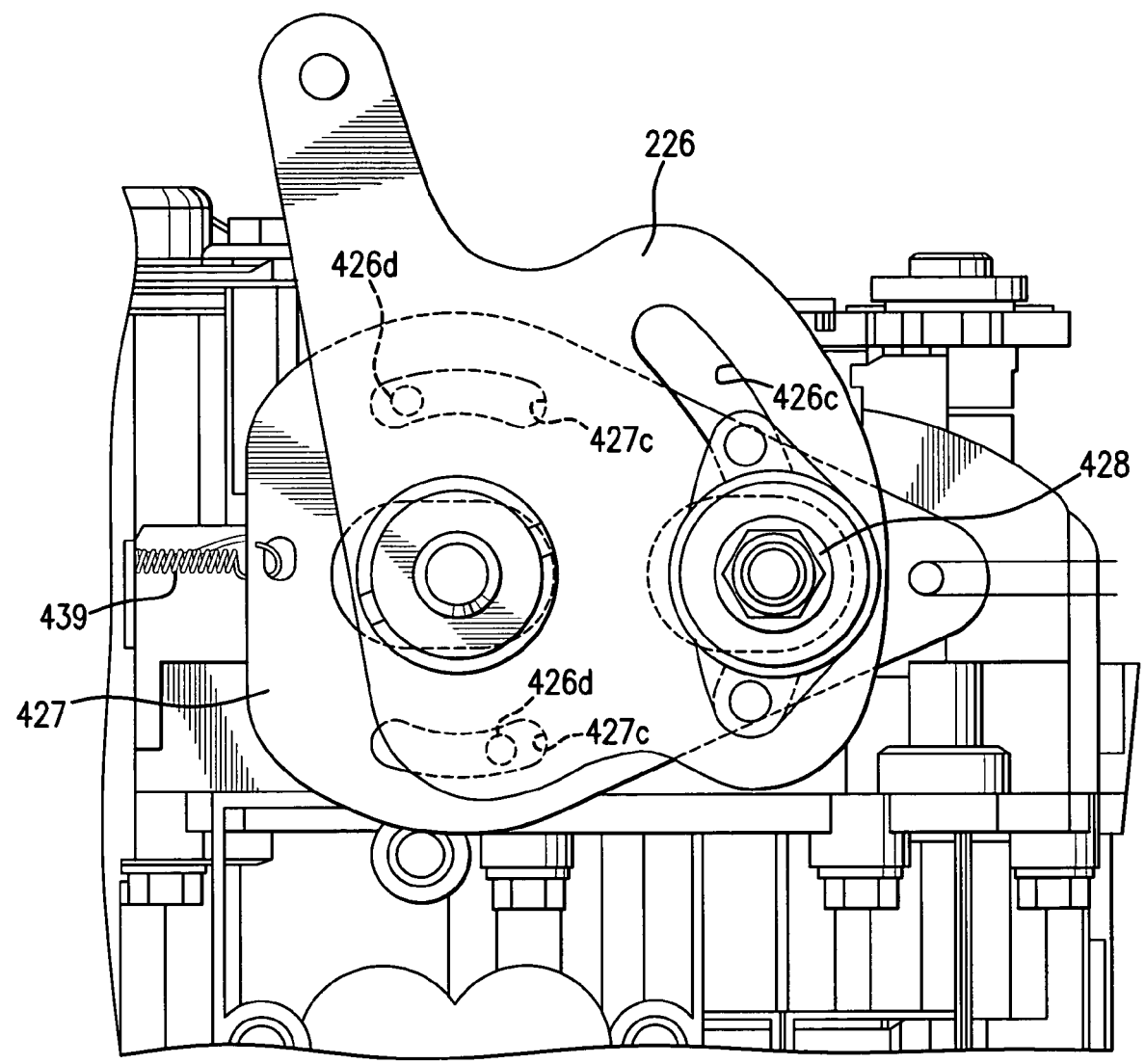

FIG. 4 shows a side view of the exterior of a portion of housing 106 and the cruise control and neutral return mechanism 107 of the present invention. Control arm 226 is shown in FIG. 4 in a neutral position. The three extreme positions of control arm 226 and the relationship of control arm 226 to the other components of cruise control and neutral return mechanism 107 are shown separately in FIGS. 5-7. FIG. 6 shows a neutral position of control arm 226. FIG. 5 shows one of a forward moving position or a reverse moving position, while FIG. 7 shows the other of a forward moving position or a reverse moving position. The direction of movement of the vehicle in relation to the position of control arm 226 is contingent upon the particular arrangement of the motor and gearing between pump 216 and axle 102. For convenience, however, we will characterize the positioning of FIG. 5 as the forward position of control arm 226 and the positioning of FIG. 7 as the reverse position of control arm 226, although one skilled in the art can appreciate the opposite arrangement.

Control arm 226 has region 426b that extends perpendicular to the longitudinal axis of the control arm shown in FIG. 2. In this region 426b, control arm has an arcuate-shaped hole 426c. Control arm 226 is slidingly supported via arcuate-shaped hole 426c by a friction shaft 428. Friction shaft 428 extends from housing 106 so that it is parallel to control shaft 225, as is discussed in further detail below with respect to FIGS. 8 and 10. Control arm 226 also includes two pins 426d, disposed on opposite sides of bore 226a. Pins 426d are parallel to control shaft 225 and extend towards housing 106 from a surface 226e of control arm 226 that faces housing 106, which is shown in FIG. 2.

FIGS. 2 and 4 show a bore 226f in control arm 226 through which control arm 226 is coupled to an operation input device, such as lever 112 via a link 112a. A user moves control arm via lever 112, for example, from an extreme forward position (FIG. 5) through a neutral position (FIG. 6) toward an extreme reverse position (FIG. 7) and vice versa. FIGS. 4 and 5-7 illustrate how the positioning of friction shaft 428 moves within arcuate-shaped hole 426c as control arm 226 swings through these extreme positions. One skilled in the art can appreciate that the control arm does not need to reach the extreme positions shown in FIG. 5 or 7. Any movement of control arm 226 away from the neutral position in FIG. 6 will place the control arm in either a forward position or a reverse position.

FIG. 4 also shows a plan view of stop plate 227 as it is positioned with respect to control arm 226. Stop plate 227 is also slidingly supported by friction shaft 428 via a second slot 427b. First and second slots 227a and 427b extend in the direction perpendicular to control shaft 225 and friction shaft 428, so that stop plate 227 can be slid along slots 227a and 427b from an operational position, such as that shown in FIGS. 4-7, to a braking position. Stop plate 227 also includes a bore 427d through which stop plate 227 is coupled to a braking input device, such as pedal 113, via a link 113a. When pedal 113 is pushed by a user, stop plate 227 is slid along slots 227a and 427b into the braking position. Stop plate 227 is biased into the operational position, shown in FIGS. 4-7, by a spring 439.

Stop plate 227 also includes two arcuate-shaped grooves 427c that receive pins 426d of control arm 226. FIGS. 4 and 5-7 illustrate how pins 426d move within arcuate-shaped grooves 427c as control arm 226 swings from an extreme forward position (FIG. 5) through a neutral position (FIG. 6) to an extreme reverse position (FIG. 7) and vice versa. When in the neutral position, pins 426d are both disposed in about the middle of the arcuate-shaped grooves, but when in one of the extreme forward or reverse positions, pins 426d are disposed closer to the ends of arcuate-shaped grooves 427c.

Figure 8:
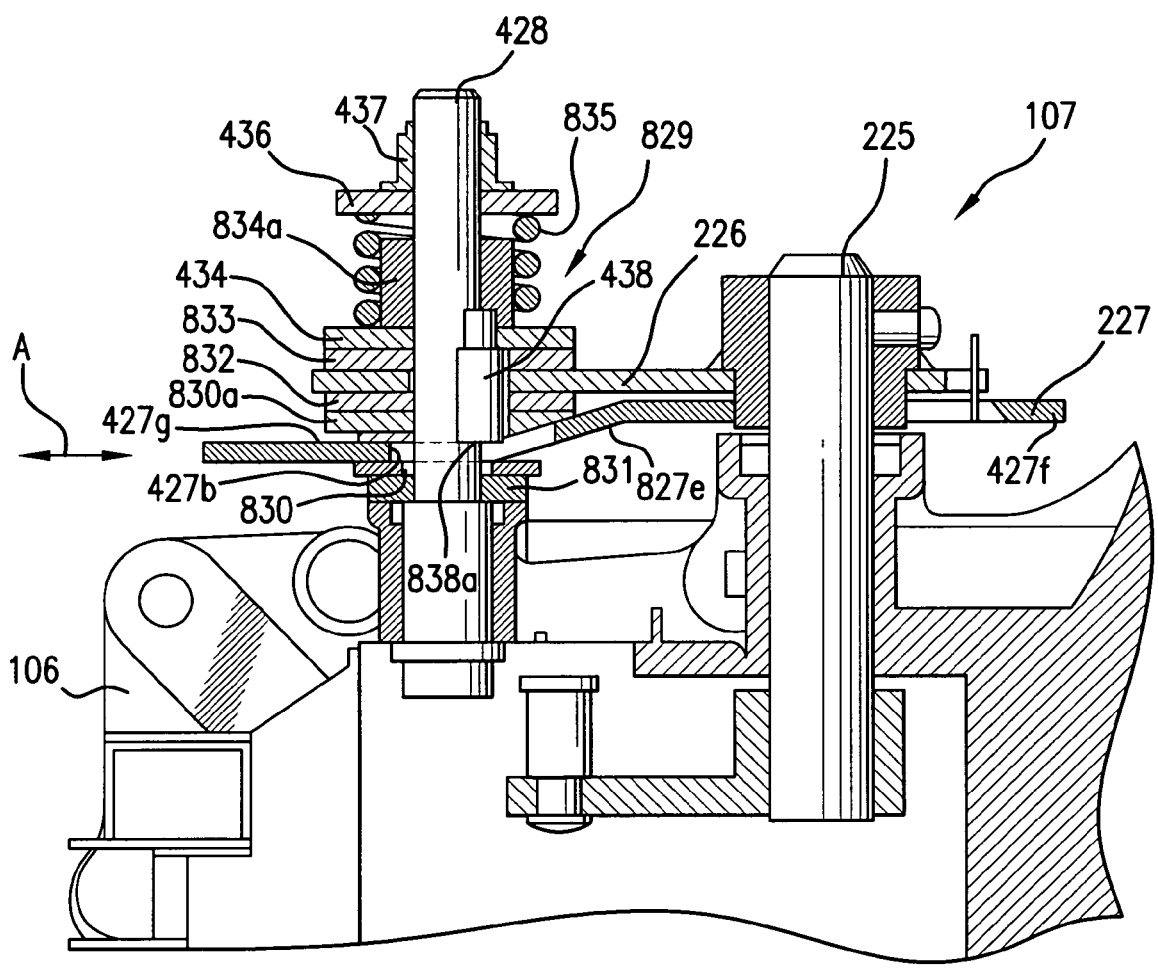
FIG. 8 is a top cross-sectional view taken along a line VIII-VIII of FIG. 4 and an expanded view of a portion of FIG. 11 labeled VIII.

FIG. 8 shows a cross-sectional view taken along line VIII-VIII of FIG. 4. FIG. 8 illustrates the relative positioning of control arm 226 and stop plate 227 as well as the friction mechanism 829. Friction mechanism 829 includes a nut 830 having a washer 830a affixed thereto that hold friction shaft 428 within housing 106. Second slot 427b in stop plate 227 slides over nut 830 between washer 830a and a shoulder 831 forming part of the connection between friction shaft 428 and housing 106. Nut 830 is thicker than stop plate 227 so that stop plate 227 is not hindered in its movement in the direction of arrow A.

Washer 830a is positioned adjacent a first friction pad 832, which rests adjacent control arm 226. First friction pad 832 may be affixed to washer 830a. In FIG. 8, control arm 226 is shown sandwiched between first friction pad 832 and a second friction pad 833. Second friction pad 833 is adjacent and may be affixed to a pressure plate 434. Pressure plate 434 includes shaft portion 834a. Each of washer 830a, first friction pad 832, second friction pad 833 and pressure plate 434 include an opening so as to surround and be supported by friction shaft 428. Pressure plate 434 and second friction pad 833 are slidably movable along friction shaft 428 and are biased towards control arm 226 via biasing spring 835. Biasing spring 835 surrounds shaft portion 834a of pressure plate 434 and is positioned between pressure plate 434 and a washer 436 affixed to a nut 437 fastened to the end of friction shaft 428.

Pressure plate 434 also includes oppositely extending arms 434b. A pin 438 extends from each of arms 434b towards housing 106, such that pins 438 are parallel to friction shaft 428, as shown in FIG. 8. Pins 438 have an end surface 838a which is adjacent to stop plate 227.

Stop plate 227 has a first end 427f where stop plate 227 is supported by control shaft 225 that is in a first plane adjacent control arm 226 and a second end 427g where stop plate 227 is supported by friction shaft 428 that is in a second plane spaced away from control arm 226. Stop plate 227 also includes a sloping region 827e between the first end 427f and the second end 427g that slopes away from control arm 226.

When an operator moves lever 112, the force that lever 112 applies to control arm 226 overcomes the frictional force applied to control arm 226 by friction pads 832, 833, and control arm 226 is moved towards a desired position. When a desired speed in a forward or reverse direction is achieved and the operator releases lever 112, the frictional force applied to control arm 226 by friction pads 832, 833 retains control arm in the desired position. The desired position may be any forward or reverse position, such as the extreme forward position shown in FIG. 5, the extreme reverse position shown in FIG. 7, or any position between the neutral position of FIG. 6 and one of the extreme forward or reverse positions of FIGS. 5 and 7.

Control arm 226 does not feature or require a conventional automatic return-to-neutral mechanism, such as a spring, which are used in conventional HSTs to bias control arm 226 towards the neutral position shown in FIG. 6. As such, the frictional force applied to control arm 226 need not overcome any automatic return-to-neutral forces to hold control arm in a forward position or reverse position. However, without an automatic return-to-neutral feature, the vehicle will continue to move in a forward or reverse direction when the operator is not physically operating lever 112, thus providing the cruise control feature of the present invention.

In order to stop the forward or reverse movement of the vehicle, the operator can move lever 112 such that control arm 226 is returned to the neutral position of FIG. 6, or the operator can press pedal 113 while the control arm 226 is still in the desired operating position. Thus, having a manual neutral return mechanism, rather than an automatic return-to-neutral mechanism as is conventional, provides the operator greater freedom in operating and stopping vehicle 100.

Figure 9:
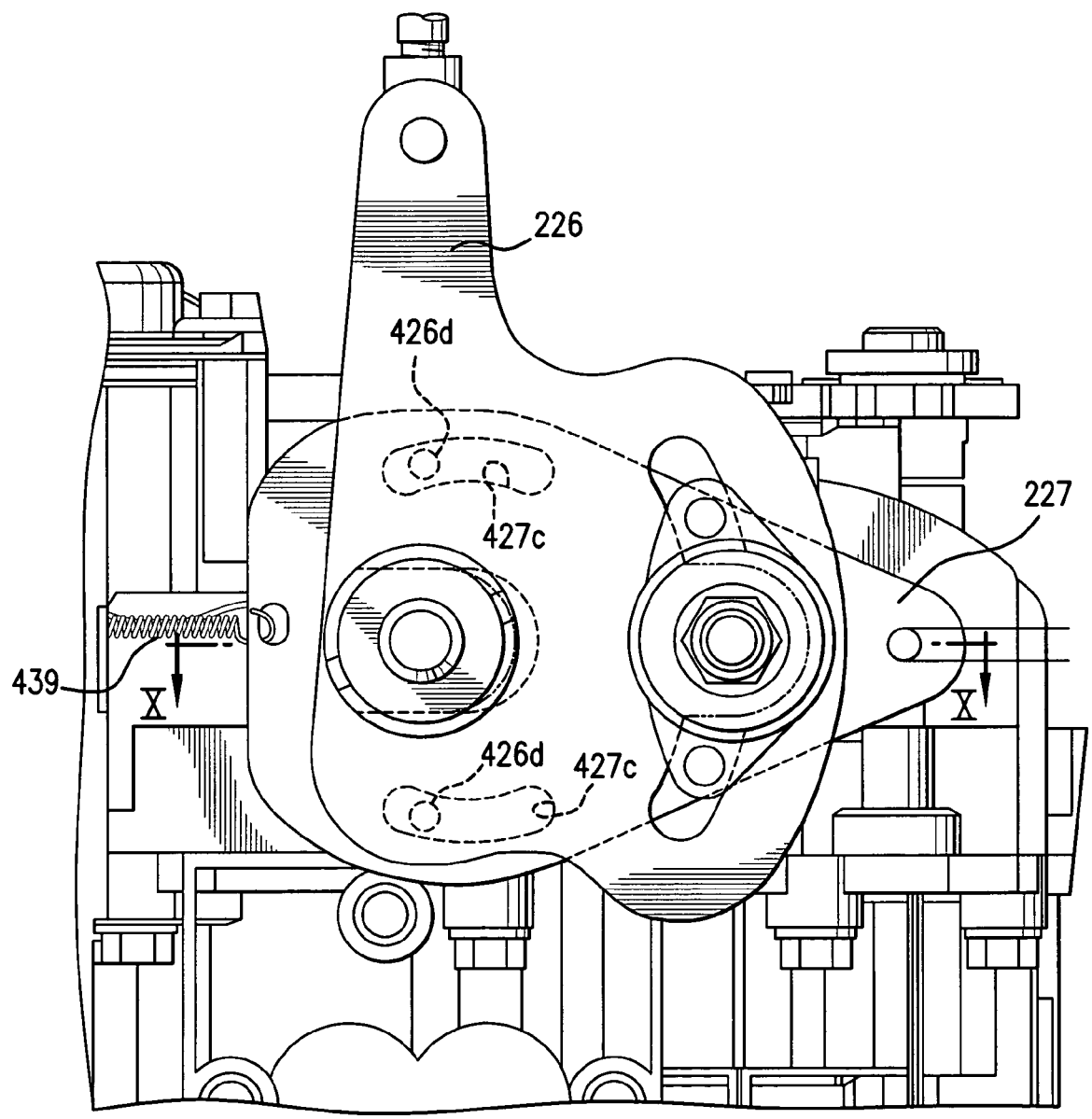
FIG. 9 is a plan view of the braking position of the mechanism shown in FIG. 4.

As discussed above, when pedal 113 is pressed, stop plate 227 is slid in the direction of arrow B in FIG. 4 into a braking position, which is shown in FIG. 9. When stop plate 227 slides, one of arcuate-shaped grooves 427c engages one of pins 426d of control arm 226, which are positioned during operation away from the neutral position shown in FIG. 6 an towards that shown in either FIG. 5 or FIG. 7. Pins 426d rotate control arm 226 back to the neutral position, as shown in FIG. 9. As can be seen in FIG. 9, pins 426d are no longer in about in the middle of arcuate-shaped grooves 427c when stop plate 227 is in the braking position, as when stop plate was in the operational position in FIG. 6.

Figure 10:
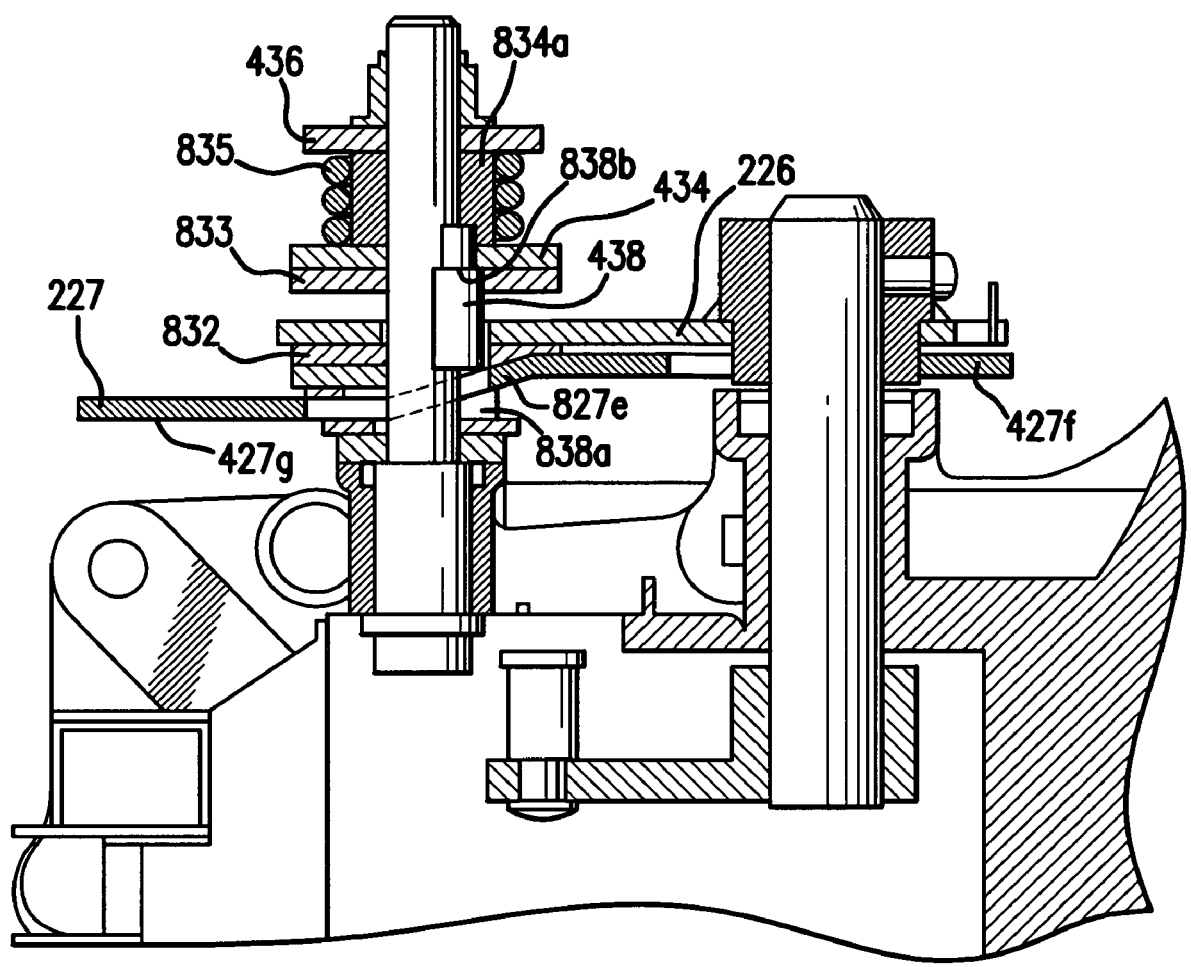
FIG. 10 is a cross-sectional view taken along line X-X of FIG. 9.

Further, in order that the force applied to control arm 226 as pins 426d are engaged by arcuate-shaped grooves 427c need not overcome the frictional force applied to control arm 226 by friction pads 832, 833, friction mechanism 829 is released when stop plate 227 is slid into the braking position shown in FIG. 9, which is illustrated in cross-section in FIG. 10.

In FIG. 10, stop plate 227 has been moved such that sloping region 827e contacts end surface 838a of pin 438. Pin 438 has a shoulder 838b that engages and moves pressure plate 434, thereby compressing spring 835 between washer 436 and pressure plate 434. The compression of spring 835 is limited once shaft portion 834a of pressure plate 434 contacts washer 436. The friction force is removed such that pressure plate 434 no longer biases friction pad 833 against control arm 226, and control arm 226 may be easily rotated by the force applied to pins 426d by arcuate-shaped grooves 427c of stop plate 227.

A return mechanism 450 is included in link 113a to automatically return pedal 113 once the operator removes his foot. Return mechanism 450 includes a housing 452 attached to link 113a. Housing 452 encloses a piston 454 and a spring 456, where piston 454 extends through a wall 452a of housing 452. Spring 456 biases piston 454 away from wall 452a. When pedal 113 is pushed, piston 454 is pulled towards wall 452a of housing 452 and spring 456 is compressed. Piston pulls against wall 452a, which pulls link 113 and which slides stop plate 227 in the direction of arrow B. When pressure is released from pedal 113, spring 456 returns pedal 113 to its operational position. Additionally, spring 439 pulls stop plate 227 back into the operational position shown in FIGS. 4-7. In an alternate embodiment, for example where braking input device is a lever instead of pedal 113, the operator may manually position stop plate 227 back into an operation position.

The neutral return mechanism described above stops the driving function of the HST by returning the pump to neutral. FIG. 11 shows how a braking mechanism (not shown) causes vehicle 100 to stop by braking the supplemental gearing somewhere between the HST and the drive wheels.

The cruise control and neutral return mechanism 107 is attached to a braking input device, such as pedal 113 via a link 113a including a return mechanism 450 as described above. However, return mechanism 450 is coupled to pedal 113 via a crossbar 1162.

Pedal 113 is also coupled via a second link 1164 to a brake shaft 1161 of a braking mechanism (not shown). Brake shaft 1161, also shown in FIG. 13, extends through housing 106 and is connected to a brake arm 1165. Brake arm 1165 has a protrusion 1165a through which link 1164 moves brake arm 1165, rotating brake shaft 1161 and activating the braking mechanism. Link 1164 slidably extends through a hole 1165b in protrusion 1165a and connects to a second return mechanism 1166 disposed on the opposite side of brake arm 1165 from pedal 113. Second return mechanism 1166, as better shown in FIG. 12, includes a first washer 1167 which is biased away from a second washer 1169 via a spring 1168. Prior to pushing pedal 113, first washer 1167 is spaced away from brake arm 1165 by a clearance D. When pedal 113 is pressed, pedal 113 pulls link 1164 in the direction of arrow C, and first washer 1167 contacts brake arm 1165 of the braking mechanism, which is also pulled in the direction of arrow C.

As pedal 113 is released, a spring 1163 returns brake arm 1165 to a non-braking position. Also, spring 1168 of return mechanism 1166 expands to aid return mechanism 450 in returning pedal 113 to a non-braking position.

The braking mechanism may be any conventional braking device which may be disposed within a housing 106 of a transaxle assembly 105. The braking device stops the power drive to axles 102, causing the drive wheels 103 to come to an immediate stop. One example is a braking device which limits the rotation of an HST motor output shaft. In other embodiments, the braking mechanism may brake anywhere along the transmission between the HST and the axles 102.

In the embodiment shown in FIG. 11, the braking mechanism is operated simultaneously with the neutral return mechanism. One skilled in the art, however, may appreciate that these features may be operated separately, for example, by having separate braking input devices coupled to each mechanism. In an alternative embodiment, the braking mechanism may become a parking brake when a device is utilized to hold either pedal 113 in a depressed position or brake arm 1165 in a braking position, for example a clamp or switch which engages either pedal 113 or brake arm 1165.

Figure 13:
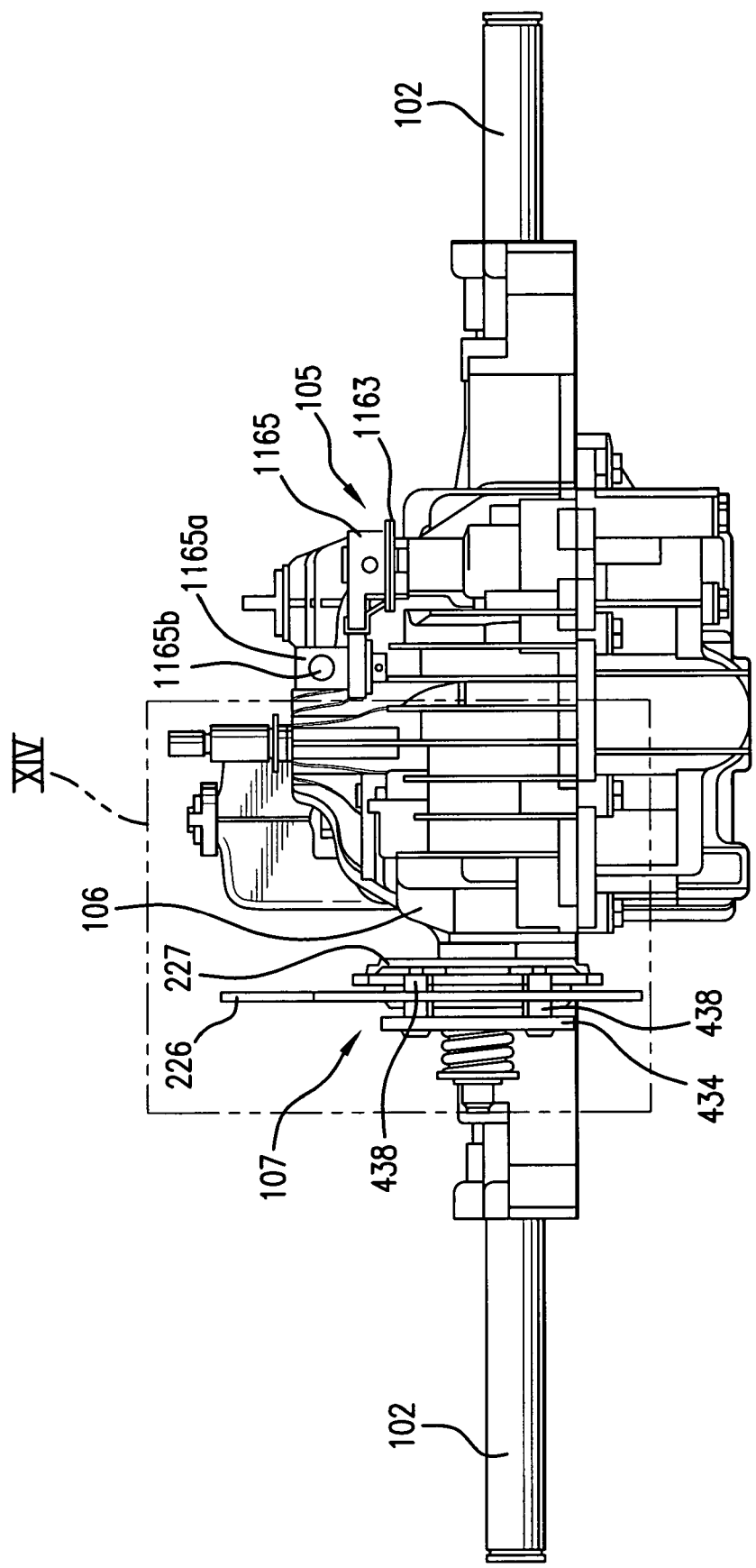
FIG. 13 is a front plan view of the transaxle assembly of FIG. 4 incorporating the present invention.
Figure 14:
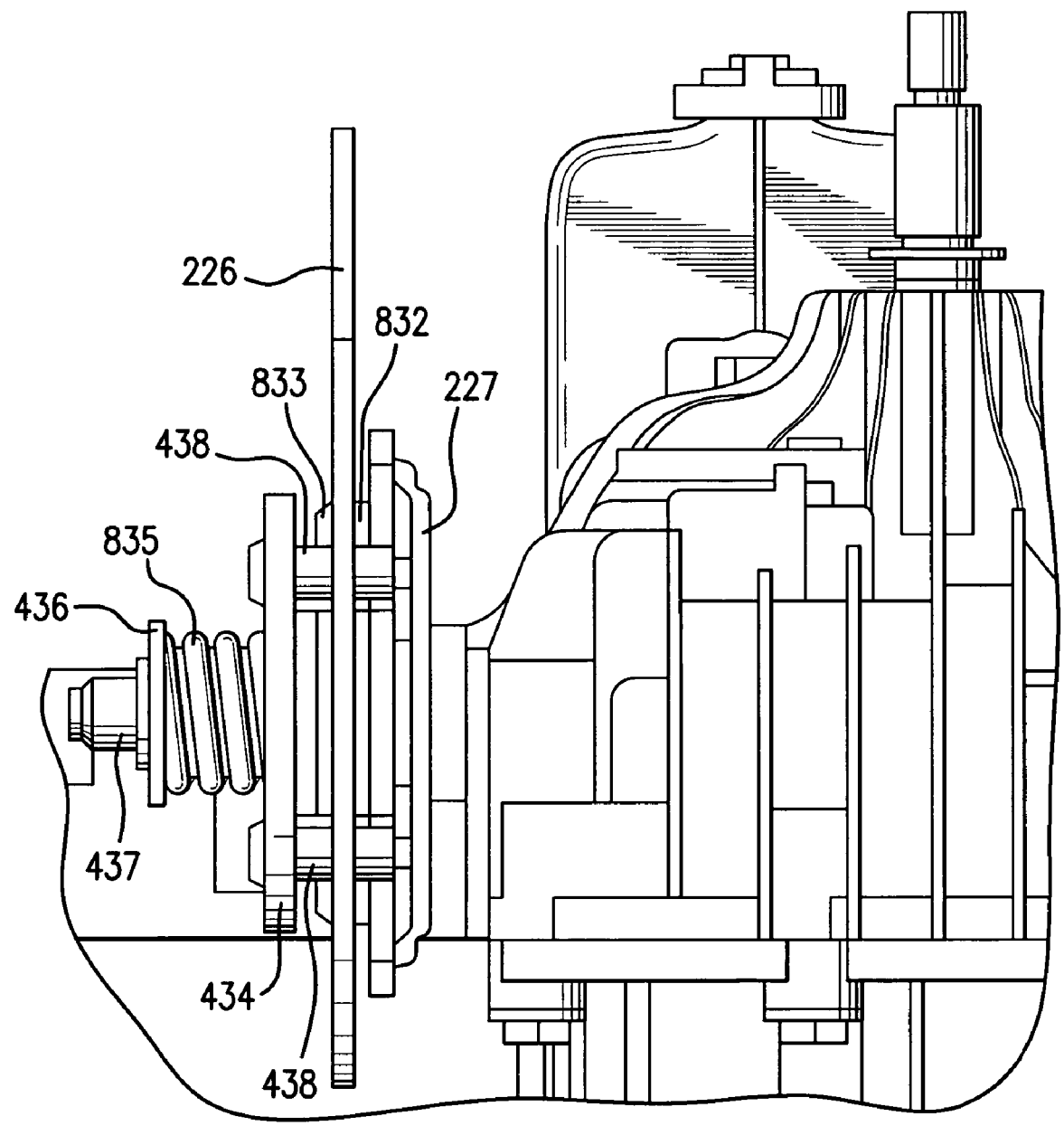
FIG. 14 is a expanded view of a portion of FIG. 13 labeled XIV.

FIGS. 13 and 14 are front views of transaxle assembly 105 further illustrating the relative relations between control arm 226, stop plate 227, pressure plate 434 and pins 438 of cruise control and neutral return mechanism 107.

In alternative embodiments, control arm 226 and stop plate 227 may be shaped differently than they appear in the Figures.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A cruise control and neutral return mechanism for a hydrostatic transaxle, comprising:

a hydraulic pump having a movable swash plate;

a control shaft coupled to said movable swash plate;

a control arm coupled to said control shaft;

a stop plate slidingly supported by said control shaft and having an operating position and a braking position;

a friction mechanism removably retaining said control arm in a one of a neutral position or an operating position;

wherein said stop plate releases said friction mechanism when in said braking position.

2. The cruise control and neutral return mechanism of claim 1, wherein said stop plate is capable of positioning said control arm in said neutral position when in said braking position.

3. The cruise control and neutral return mechanism of claim 2, wherein said control arm further includes at least one pin extending therefrom and wherein said stop plate engages said at least one pin when in said braking position.

4. The cruise control and neutral return mechanism of claim 1, wherein friction mechanism includes at least one friction pad biased against said control arm.

5. The cruise control and neutral return mechanism of claim 4, wherein said control arm is sandwiched between two friction pads.

6. The cruise control and neutral return mechanism of claim 5, wherein a first friction pad is fixed and said second friction pad is biased against said control arm.

7. The cruise control and neutral return mechanism of claim 4, wherein said stop plate is capable of lifting said friction pad from said control arm to release said friction mechanism.

8. The cruise control and neutral return mechanism of claim 4, wherein said stop plate includes a sloping section which engages a pin coupled to said friction pad only when in said braking position.

9. The cruise control and neutral return mechanism of claim 8, wherein said pin is coupled to a pressure plate which is adjacent said friction pad and biased by a spring.

10. The cruise control and neutral return mechanism of claim 1, wherein said stop plate engages a pin protruding from an adjacent surface of said control arm.

11. The cruise control and neutral return mechanism of claim 10, wherein said pin is engaged by at least one groove in said stop plate.

12. A hydrostatic transmission comprising:

a hydraulic pump including an input shaft, a movable swash plate and a control shaft coupled to said swash plate;

a housing incorporating at least said hydraulic pump, wherein said control shaft extends through said housing;

a hydraulic motor fluidly connected to said hydraulic pump;

a control arm coupled to said control shaft having various operating positions;

a friction mechanism removably retaining said control arm in one of said various operating positions, said friction mechanism including at least one friction pad biased against said control arm via a pressure plate;

a stop plate slidingly supported by said control shaft and having a operating position and a braking position, said stop plate engaging a portion of said pressure plate when in said braking position.

13. The hydrostatic transmission of claim 12, wherein said friction mechanism is supported by a friction shaft extending from said housing parallel to said control shaft.

14. The hydrostatic transmission of claim 13, wherein said control arm is slidingly supported by said friction shaft via a hole in said control arm.

15. The hydrostatic transmission of claim 14, wherein said hole is arcuate-shaped.

16. The hydrostatic transmission of claim 12, wherein said stop plate is capable of positioning said control arm in a neutral position when in said braking position.

17. The hydrostatic transmission of claim 16, wherein said stop plate includes at least one groove and said control arm includes at least one pin extending therefrom which is slidably positioned within said at least one groove.

18. The hydrostatic transmission of claim 17, wherein said at least one groove of said stop plate engages said at least one pin when said stop plate is in said braking position.

19. The hydrostatic transmission of claim 17, wherein said groove is arcuate-shaped.

20. The hydrostatic transmission of claim 12, wherein said pressure plate includes a pin extending from the surface thereof and said stop plate includes a gradually sloping section which does not engage said pin when said stop plate is an operating position and which engages said pin when said stop plate is in said braking position.

21. A vehicle comprising:

a vehicle chassis;

a prime mover affixed to said chassis;

a hydraulic pump including an input shaft coupled to said prime mover, a movable swash plate, and a control shaft coupled to said swash plate;

a housing for encasing at least said hydraulic pump, said housing having an exterior surface from which said input shaft and said control shaft extend;

a hydraulic motor fluidly interconnected to said hydraulic pump;

an axle drivingly coupled to said hydraulic motor;

a pair of drive wheels disposed on said axle;

a driving input device coupled to said control shaft via a control arm, said control arm extending in a plane perpendicular to said control shaft and having an arcuate-shaped hole therein and at least one pin extending from a surface of said control arm such that said pin is parallel with said control shaft;

a friction shaft extending from said exterior surface of said housing parallel to said control shaft and being slidably moveable within said arcuate-shaped hole in said control arm, said friction shaft supporting a pair of friction pads, a pressure plate and a spring biasing said pressure plate and said friction pads towards one another, said pressure plate having at least one pin extending parallel to said friction shaft; and a stop plate having a first slot movably supported by said control shaft and a second slot movably supported by said friction shaft, said stop plate being coupled to a braking input device that is capable of sliding stop plate along said first and second slots from an operating position to a braking position, said stop plate also having at least one arcuate-shaped groove receiving said at least one pin of said control arm, wherein said stop plate has a first end adjacent said control shaft in a first plane that is adjacent said control arm, a gradually sloping region, and a second end adjacent said friction shaft in a second plane that is spaced away from said control arm; and wherein when said stop plate is in said operating position, said friction pads are biased against said control arm and, when said stop plate is in said braking position, said sloping region engages said pin of said pressure plate such that one of said friction pads is spaced away from said control arm and said at least one arcuate-shaped groove of said stop plate engages the at least one pin of the control arm.

22. A hydrostatic transmission comprising:

a hydraulic pump having a control shaft;

a hydraulic motor fluidly connected to said hydraulic pump;

a braking mechanism having a brake shaft;

a housing enclosing at least said hydraulic pump, said hydraulic motor and said braking mechanism, wherein said control shaft and said brake shaft extend through said housing;

a control arm coupled to said control shaft;

a brake arm coupled to said brake shaft;

a friction mechanism removably retaining said control arm in a desired position;

a stop plate slidingly supported by said control shaft and having an operating position and a braking position, said stop plate releasing said friction mechanism and positioning said control arm in a neutral position when in said braking position; and a braking input device simultaneously coupled to said brake arm and said stop plate, wherein operation of said braking input device operates said braking mechanism and moves said stop plate from said operating position to said braking position.

* * * * *